United States Patent
Bowers et al.

(10) Patent No.: US 7,017,688 B2
(45) Date of Patent: Mar. 28, 2006

(54) INDEPENDENT SUSPENSION FOR MULTI-USE VEHICLE

(75) Inventors: Lee N. Bowers, Tokyo (JP); Mark Kohls, Plain City, OH (US); Philip Tsiaras, Dublin, OH (US)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 209 days.

(21) Appl. No.: 10/382,386

(22) Filed: Mar. 6, 2003

(65) Prior Publication Data

US 2003/0222432 A1 Dec. 4, 2003

Related U.S. Application Data

(60) Provisional application No. 60/368,604, filed on Mar. 29, 2002, provisional application No. 60/368,606, filed on Mar. 29, 2002, provisional application No. 60/368,603, filed on Mar. 29, 2002, provisional application No. 60/362,982, filed on Mar. 8, 2002, provisional application No. 60/362,981, filed on Mar. 8, 2002.

(51) Int. Cl.
*B60G 5/02* (2006.01)
*B62D 55/00* (2006.01)

(52) U.S. Cl. .................. 180/9.54; 180/9.5; 180/9.6; 280/676; 280/683

(58) Field of Classification Search .............. 180/9.54, 180/9.5, 9.6; 280/676, 683
See application file for complete search history.

(56) References Cited

U.S. PATENT DOCUMENTS

| | | | |
|---|---|---|---|
| 3,430,790 A * | 3/1969 | Beltrami ................... 414/695 |
| 3,521,527 A | 7/1970 | Gies et al. | |
| 3,602,470 A | 8/1971 | Reynolds | |
| 3,724,397 A | 4/1973 | Sargent | |
| 3,856,325 A | 12/1974 | Willets | |
| 3,889,769 A * | 6/1975 | Blomstrom et al. ......... 180/9.5 |
| 3,894,597 A * | 7/1975 | Wagner .................... 180/9.48 |
| 3,948,334 A * | 4/1976 | Danielson et al. ....... 180/24.13 |
| 3,977,693 A * | 8/1976 | Gamaunt ................. 180/24.01 |
| 3,982,598 A | 9/1976 | Purcell et al. | |
| 4,030,738 A | 6/1977 | Willetts | |
| 4,043,417 A | 8/1977 | Orpana | |
| 4,153,265 A * | 5/1979 | McColl ................... 180/24.13 |
| 4,155,570 A | 5/1979 | Wiley, Jr. | |
| 4,159,751 A * | 7/1979 | Garman ...................... 180/22 |
| 4,227,711 A | 10/1980 | Wheeler | |
| 4,360,220 A | 11/1982 | Beers | |
| 4,364,443 A * | 12/1982 | Sato et al. .................. 180/9.5 |
| 4,429,898 A | 2/1984 | Bedenbender et al. | |

(Continued)

*Primary Examiner*—Paul N. Dickson
*Assistant Examiner*—George D. Spisich
(74) *Attorney, Agent, or Firm*—Rankin, Hill, Porter & Clark LLP; Christen Millard

(57) ABSTRACT

A half-track vehicle includes a frame, first and second beams having forward and rearward wheels attached thereto, and first and second suspension systems. The frame includes a first side and a second side, and the first suspension system suspends the first beam from the frame adjacent the first side of the frame and the second suspension system suspends the second beam from the frame adjacent the second side of the frame. Each suspension system includes at least one element, such as a trailing arm, and A-arm, and a transverse suspension member, that is attached to one of frame and an associated one of the first and second beams in a manner that permits three degrees of rotational movement and that transmits motive force from the first and second beams to the frame.

30 Claims, 7 Drawing Sheets

U.S. PATENT DOCUMENTS

| | | |
|---|---|---|
| 4,516,649 A | 5/1985 | Braathen |
| 4,519,654 A | 5/1985 | Satzler et al. |
| 4,582,153 A | 4/1986 | Shinsen |
| 4,811,972 A | 3/1989 | Wiley, Jr. |
| 4,923,257 A | 5/1990 | Purcell |
| 4,974,684 A | 12/1990 | Stevens |
| 4,987,965 A | 1/1991 | Bourret |
| 5,016,905 A | 5/1991 | Licari |
| 5,064,011 A | 11/1991 | Ogano et al. |
| 5,076,378 A | 12/1991 | Lagace |
| 5,113,958 A | 5/1992 | Holden |
| 5,293,948 A | 3/1994 | Crabb |
| 5,482,326 A | 1/1996 | Levi |
| 5,566,773 A | 10/1996 | Gersmann |
| 5,575,347 A * | 11/1996 | Uchibaba et al. ............ 180/9.1 |
| 5,791,681 A | 8/1998 | VanDenberg |
| 5,975,226 A * | 11/1999 | Matsumoto et al. ....... 180/9.34 |
| 6,840,338 B1 * | 1/2005 | Bowers et al. ............. 180/9.54 |

* cited by examiner

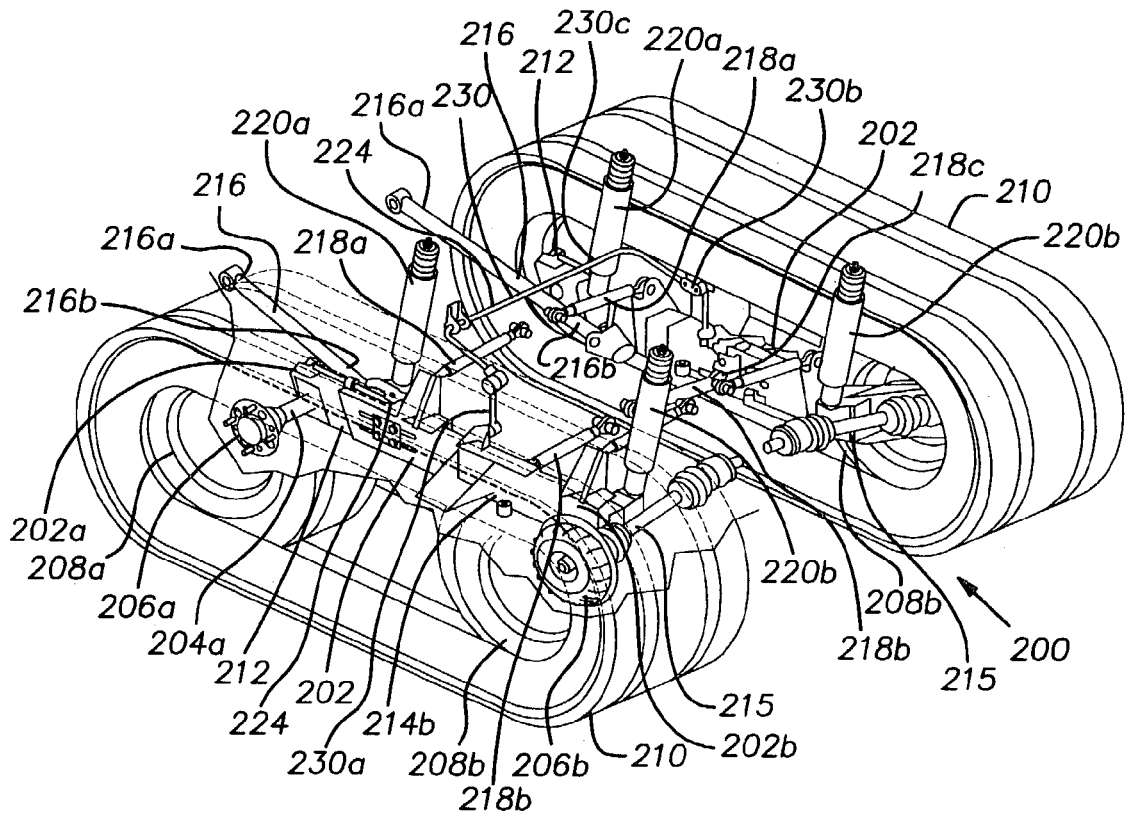
FIG.8
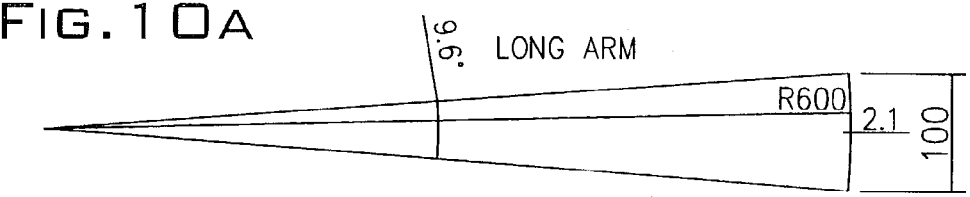
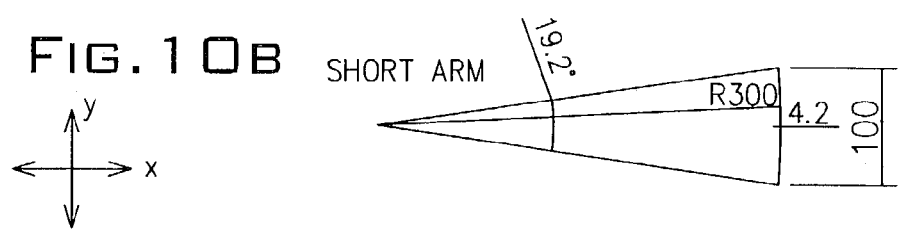

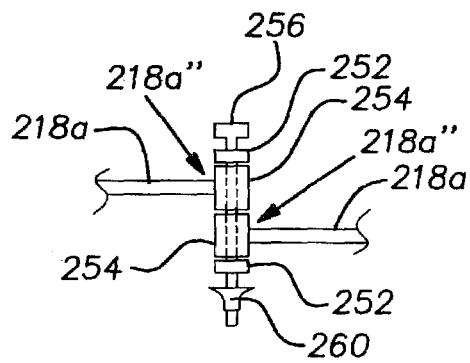
FIG. 9A
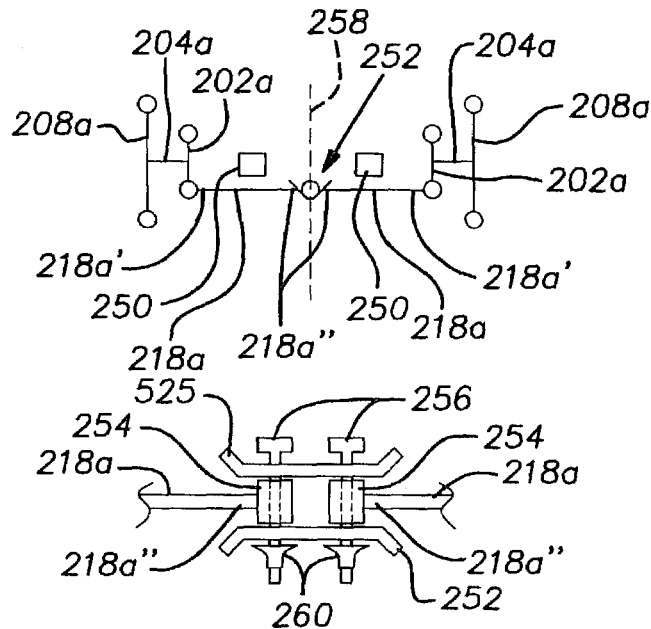
FIG. 9B
FIG. 9C
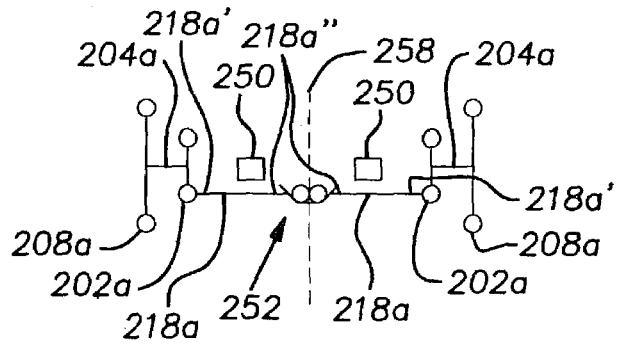
FIG. 9D
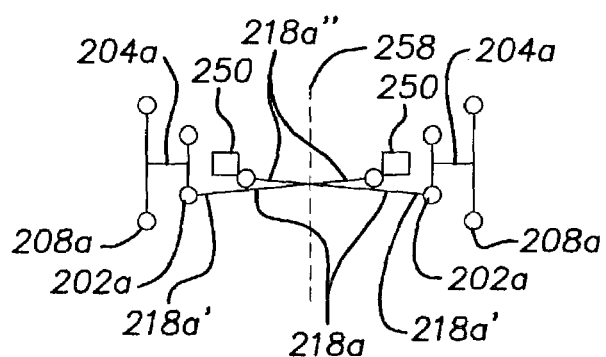
FIG. 9E

INDEPENDENT SUSPENSION FOR MULTI-USE VEHICLE

BACKGROUND OF THE INVENTION

1. Field of the Invention

The present invention generally relates to vehicle suspension systems and, more particularly, toward an independently suspended beam structure for a multi-use vehicle.

2. Description of Related Art

It is known to independently suspend wheels from a vehicle frame. An independently suspended wheel is able to move in one or more directions without affecting the movement of any other wheels. It is desirable to independently suspend wheels to improve the ride of a vehicle when traveling over uneven ground. It is also desirable to use a track on each side of the vehicle. The use of a track, rather than individual wheels only, improves the vehicle's flotation on soft ground as well as the traction. It is particularly important to use an independent suspension system when a track is used, to maximize the amount of surface area of each track in contact with the ground on each side of the vehicle.

It is also known to suspend beams from vehicles. In a typical configuration, a beam is suspended on each side of a vehicle. Two or more wheels are attached to the beam. Typically, axles or other structures rigidly interconnect the beams so that the beams move together relative to the frame. These types of structures are normally used in areas where the terrain is likely to be substantially level.

Some suspension systems are like those used on military vehicles and are schematically illustrated in FIG. 1. This half-track structure 10 includes a track 12 that surrounds a plurality of wheels 14, 16. The two end wheels 14 are mounted directly to the frame with no suspension system. The main load-bearing wheels 16 are individually suspended from the frame.

Other suspension systems are used on vehicles similar to the SNO CAT vehicle, which is made by Tucker Sno Cat Corporation of Oregon, and schematically illustrated in FIG. 2. This half-track structure 20 includes a track 22 surrounding a plurality of wheels 24, 26. The top wheel 24 is connected to a central axle 28. The central axle 28 provides the drive function and is suspended from the vehicle. The remaining wheels 26 are attached to the central axle 28. The track 22 can rotate about the central axle 28, but the central axle links the motion of the two structures 20 on either side of the vehicle.

Finally, there are MUV suspension systems, such as is schematically illustrated in FIG. 3. In this structure 30, a trailing arm 32 is attached to each beam 34 (only one beam shown in the drawing) and connects the beam to a frame (not shown). While each beam may include its own springs or cushions 36, the axles 38 conventionally extend across the vehicle, thereby linking the motion of the two beams.

Such structures are unsatisfactory for use in an off-road setting. Typically, an MUV is used in an area where there are substantial differences in terrain on both sides of the vehicle. It is also desirable to use a half-track on an MUV to permit the MUV to traverse many types of terrain, particularly in wet areas, without sinking. However, no structure has been developed that permits each beam to be independently suspended. In an off-road setting, an independent suspension would be particularly desirable since the variations in the level of the ground can be substantial.

Further, one of the problems to be solved with off-road vehicles is that of travel over large objects, such as logs. Manufacturers have addressed this problem by using low pressure tires. The use of a low pressure tire allows the tire to deform when it encounters an object. This increases the surface area, and hence the friction, between the low pressure tire and the object, enabling the motive force of the vehicle to push the vehicle up and over the object. However, the use of low pressure tires is not desirable for use with a tracked vehicle. If a low pressure tire is used and the tire deforms, the track tends to have an increased amount of slack at the time of deformation, substantially increasing the risk of the track slipping off the tires.

Moreover, if a tracked vehicle is to be used, a high pressure tire should be used to prevent the detachment of the track. Unfortunately, the use of such a tire creates a reduced amount of surface area contact between the vehicle and the obstacle, which causes the track to slip against the obstacle and prevents the vehicle from passing over the obstacle. Therefore, in the prior art a high pressure tire is known to be undesirable.

SUMMARY OF THE INVENTION

The present invention is directed toward an improved suspension system for an off road or multi-use vehicle. More specifically, the present invention is directed toward a half-track vehicle incorporating a suspension system that is adapted for use over rough terrain.

In accordance with the present invention, a half-track vehicle includes a frame, first and second beams having forward and rearward wheels attached thereto, and first and second suspension systems. The frame includes a first side and a second side, and the first suspension system suspends the first beam from the frame adjacent the first side of the frame and the second suspension system suspends the second beam from the frame adjacent the second side of the frame. Each suspension system includes at least one element that is attached to one of the frame and an associated one of the first and second beams in a manner that permits three degrees of rotational movement and that transmits motive force from the first and second beams to the frame.

In further accordance with the present invention, each of the suspension systems includes a trailing arm that is secured between the beam and the frame. The trailing arm is preferably attached to a top of the beam at forward end thereof adjacent the forward wheel, and extends forwardly therefrom to the frame.

In further accordance with the present invention, the suspension systems include an A-arm that is secured between the associated beam and the frame. The A-arm is preferably secured to a top of the beam at forward end of the beam adjacent the forward wheel.

In further accordance with the present invention, the suspension systems include transverse suspension members that extend from a proximal end secured to the beams to a distal end disposed at least adjacent the longitudinal centerline of the vehicle. In accordance with one version of the invention, the vehicle frame includes a support structure disposed along the longitudinal centerline to which the transverse suspension member distal ends are rotatably secured. In accordance with another version of the invention, the proximal ends of the transverse suspension members are secured to an associated beam on one side of the vehicle and the distal ends of the transverse suspension members are secured to the frame on the opposite side of the vehicle.

BRIEF DESCRIPTION OF THE DRAWINGS

These and further features of the invention will be apparent with reference to the following description and drawings, wherein:

FIG. 8 is a perspective view of a further modified embodiment of a half-track suspension structure;

FIGS. 9a–9e schematically illustrate several transverse suspension member attachment schemes according to the present invention;

FIGS. 10a–10b schematically illustrate the effect of differences in length of the suspension members;

DETAILED DESCRIPTION OF THE PREFERRED EMBODIMENTS

Figure 1:
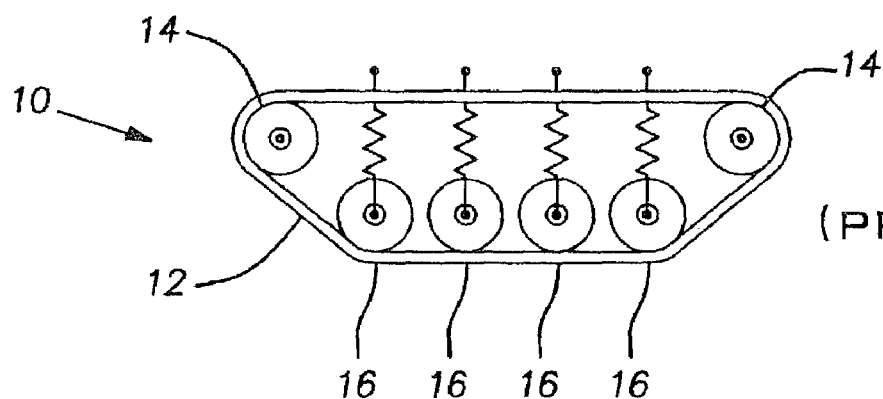
FIG. 1 is a schematic side view of a first prior art half-track suspension structure.
Figure 2:
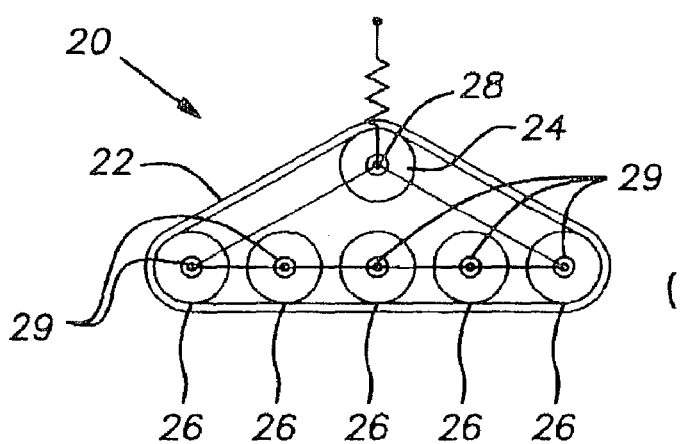
FIG. 2 is a schematic side view of a second prior art half-track suspension structure.
Figure 3:
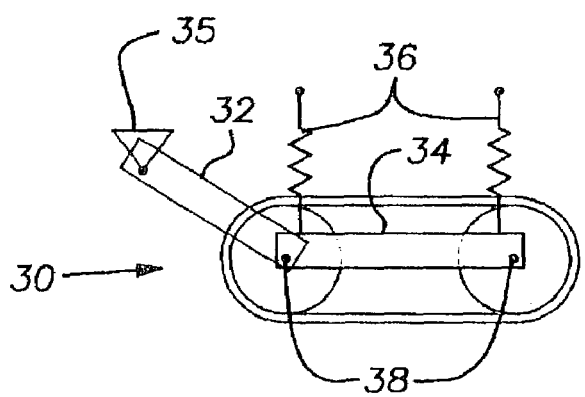
FIG. 3 is a schematic side view of a third prior art half-track suspension structure.

The present invention relates to a suspension system for a half-track vehicle. Initially, it is noted that the drawings are not to scale, but will be more easily understood by a person of ordinary skill in the art than drawings from another perspective or drawings shown in proper proportion. It is further noted that the drawings do not show any other structures attached to the vehicle, nor do they show any structures necessary for the functioning of the vehicle that are not directly related to the suspension structure disclosed. Accordingly, the vehicle shown in the drawing figures may not be functional without the other parts, such as a drive train and the like. However, any drive train that may be used in connection with the present structure is relatively conventional in nature. A person of ordinary skill in the art can easily adapt a known MUV or ATV drive train for use in connection with the present vehicle.

It is also noted that the present structure is also capable of being used on a trailer that has no independent motive power. The use of a structure on a trailer is useful in such areas as in agricultural applications. In such applications, it is important to minimize the pressure on the ground from the trailer, to prevent damaging crops or other plants. Another area in which a trailer would be useful occurs when the trailer is to be used on snow or in a muddy area, particularly if there is rough terrain. In these cases and similar situations, the use of a tracked vehicle distributes the weight of the trailer, minimizing the weight in any one particular area. In such a situation, the independent suspension to be described below remains important, due to the inherent unevenness of the terrain. However, no motive power need be used, since a tow vehicle pulls the trailer. Accordingly, there is no absolute necessity for a drive train assembly to be used in connection with the present vehicle in such a situation.

Figure 4:
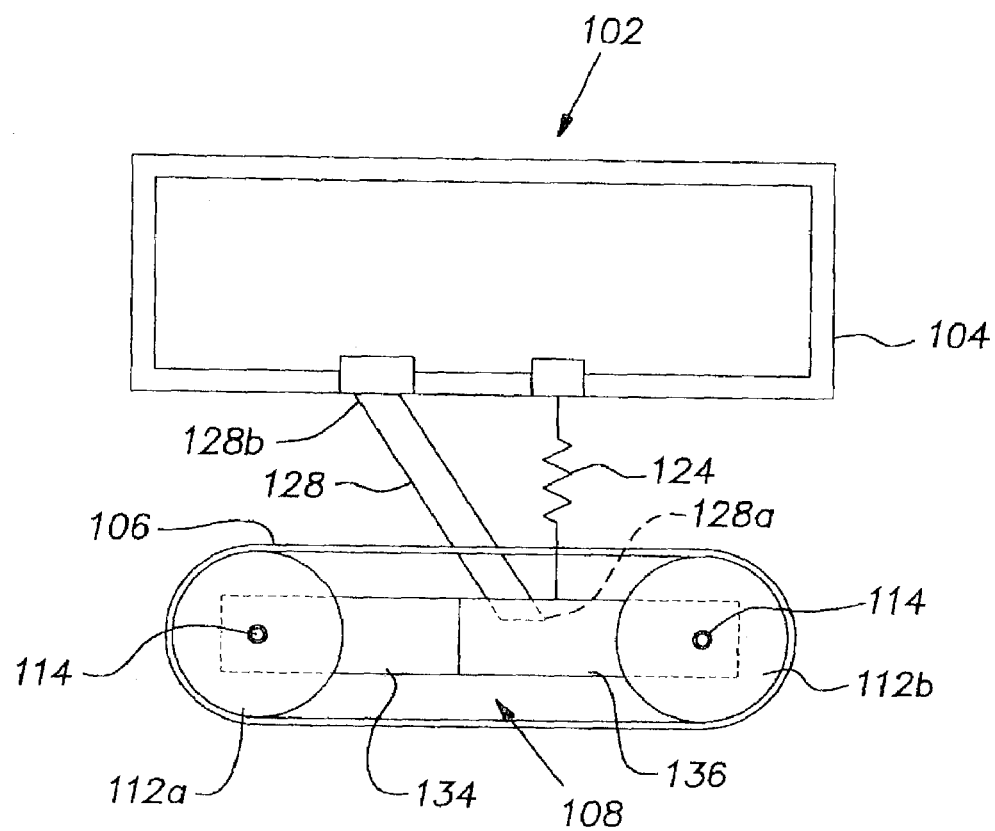
FIG. 4 is a schematic side view of an embodiment of a half-track suspension structure and vehicle in accordance with the present invention.
Figure 5:
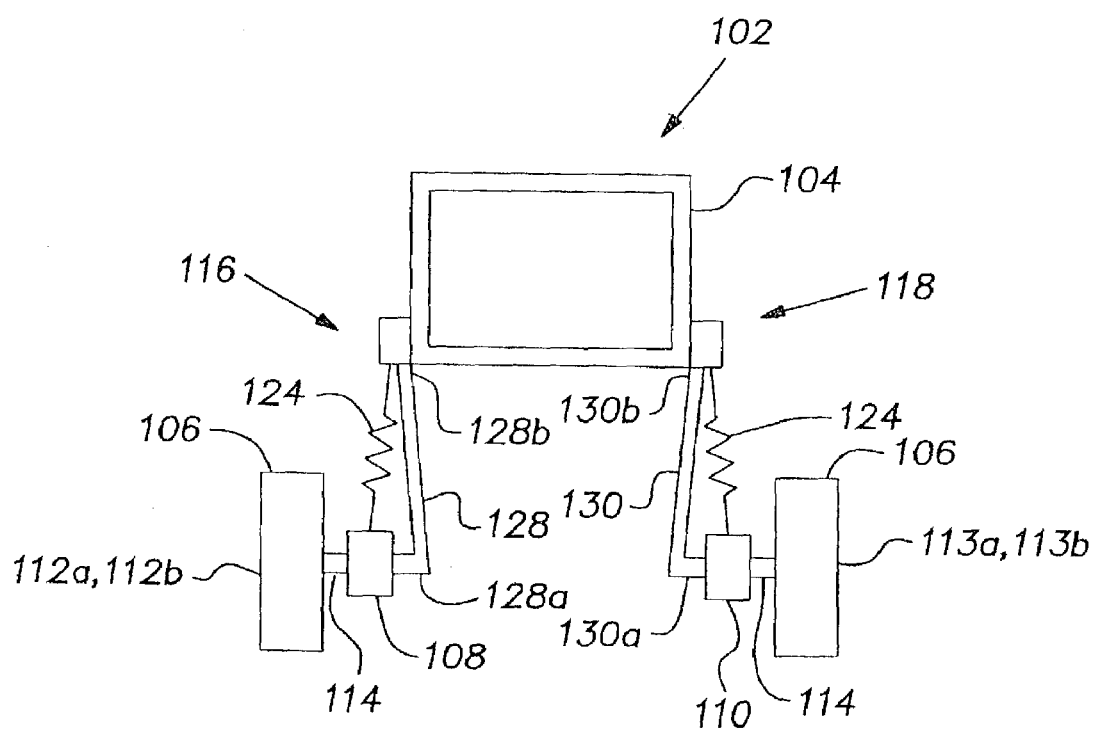
FIG. 5 is a schematic end view of the vehicle shown in FIG. 4.

FIGS. 4 and 5 schematically illustrate a rear portion of a half-track vehicle according to first embodiment of the present invention. The half-track vehicle 102 includes a frame 104, a pair of tracks 106, first and second beams 108, 110, a plurality of wheels 112a, 112b, 113a, 113b, a plurality of cushions 124, and first and second trailing arms 128, 130. The vehicle further includes front wheels (not shown in FIGS. 4–5). The wheels are associated with one of a first and second lateral side 116, 118 of the vehicle 102 and are referred to hereinafter as being either a mid wheel 112a, 113a or a rear wheel 112b, 113b, respectively. Preferably, the rear wheels 112b, 113b are powered by known drive means (not shown), as will be apparent from the following discussion. Alternatively, the mid wheels 112a, 113a, or both the mid and rear wheels may be powered.

Each of the wheels 112a, 112b on the first lateral side 116 of the frame 104 is connected to the first beam 108, while each of the wheels 113a, 113b on the second or opposite lateral side 118 of the frame 104 is connected to a second beam 110. An axle 114 is associated with each of the wheels. The axles 114 are secured to the beams 108, 110 and extend outwardly therefrom, with the associated wheel being secured to an end of the axle, as is well known in the art. Naturally, if the rear wheels are powered, the rear axles will extend inwardly from the beam for connection to the drive means (not shown). Each of the axles 114 in the illustrated embodiment extend only between one of the beams 108, 110 and the associated wheel 112a, 112b, 113a, 113b such that no single axle interconnects wheels on the first and second sides 116, 118 of the vehicle.

Each beam 108, 110 is preferably made from two parts 134, 136 that slidably interfit with one another. In order to place the wheels within the track, the wheels 112a, 112b, 113a, 113b are attached to the axles 114, which are each secured to one of the beam parts 134, 136, and the two beam parts 134, 136 are slidably interfit with one another. The track 106 is then placed around the wheels, and the two parts 134, 136 are slid away from each other until the track 106 has the desired tension. Thereafter, the two beam parts 134, 136 are attached to one another using conventional techniques, such as mechanical fasteners.

Because it is often desirable to make the beams of steel for strength and durability, the two beam parts 134, 136 may be joined by welding, and an additional track-tensioning device (i.e., one associated with just one of the beam portions 134, 136) may be used to adjust the track tension which varies over time, due to age, use, humidity, and the like. Therefore, although the sliding feature and joining techniques described hereinbefore are illustrative of the preferred embodiment, the present invention is not limited thereto. Rather, it is believed apparent that many other structures and methods may be used to properly position and tension the track 106 on the wheels. In addition, while the use of the track 106 is desirable, it is not necessary, and the independently suspended beam structure can be used only with the wheels should the track be omitted.

A suspension system connects the beams 108, 110 to the frame 104 and permits the beams on each side of the frame to move relative to the frame and substantially independently of one another. The suspension system includes the cushions 124 and the trailing arms 128, 130.

With continuing reference to FIGS. 4 and 5, one of the cushions 124 extends between the first beam 108 and the frame 104, while an identical cushion 124 extends between the second beam 110 and the frame 104. Alternatively, a pair of cushions could be used on each side 116, 118, wherein one of the cushions will be disposed adjacent the mid wheel 112a, 113a, while another of the cushions will be disposed adjacent the rear wheels 112b, 113b. The cushions 124 shown in FIGS. 4–5 act as springs that resist compression and tension, and thus serve to dampen vertical movement of the frame and beams relative to one another. Naturally, any known cushioning mechanism can be used, such as a shock absorber, hydraulic system, or the like, depending on the level of strength and durability needed. A person of ordinary skill in the art is able to select an appropriate structure for cushioning the movement of any particular beam structure.

The first trailing arm 128 is on the first side 116 of the vehicle and extends between the first beam 108 and the frame 104. The second trailing arm 130 is on the second side 118 of the vehicle and extends between the second beam 110 and the frame 104. More specifically, the trailing arms 128, 130 include a first end 128a, 130a pivotally secured to the associated beam 108, 110, respectively, and a second end 128b, 130b pivotally secured to the frame 104.

The pivotal connection between the trailing arm first end 128a, 130a and the beam 108, 110, on one hand, and between the trailing arm second end 128b, 130b and the frame 104, on the other hand, preferably is a swivel-type ball-and-socket type connection that permits the up, down, left and right motion of the trailing arm relative to the beam and frame. While most of the rotary motion at the connections will be in vertical direction as the beam 108, 110 moves upward and downward relative to the frame 104, a certain degree of horizontal pivoting, or a certain degree of movement including a horizontal component, may be desirable should the beams twist or cant during use. In addition to permitting a certain range of motion between the frame 104 and the beams 108, 110, the trailing arms 128, 130 also serve as the primary paths for transmitting driving force from the track structure to the frame 104, and therefore are relatively rigid. Accordingly, the trailing arm 128, 130 and the trailing arm joints or connections must be sufficiently strong to bear the forces communicated therethrough.

Because each of the first and second beams 108, 110 is separately joined to the frame 104 and is not joined to the other of the first and second beams 108, 110, the first and second beams are permitted to move independently of each other. Thus, one of the beams 108, 110 may raise/dip and rebound without causing the frame to twist due to the other beam 110, 108 simultaneously dipping/raising and rebounding.

It is noted herein that the illustration of the present invention in FIGS. 4 and 5 is somewhat schematic and should not be taken too literally. For example, in the drawings the beams 108, 110 are positioned entirely below the frame 104. This depiction is for ease of understanding. The beams 108, 110 can be positioned nearer to and partially overlapping the frame 104. In addition, the frame 104 is shown as being generally rectangular with a square cross section. The frame 104 need not have such a geometric shape. In addition, the frame 104 may include any number of crossbars, rather than or in addition to the end cross bars shown. The cushions 124 and the trailing arms 128, 130 are shown as being attached near the bottom of the frame 104. However, the cushions 124 and the trailing arms 128, 130 need not be so positioned, but may instead be attached to the frame 104 at any convenient location.

Turning now to FIGS. 6–16, a rear portion of a half-track vehicle incorporating a different configurations of a suspension system according to the present invention are illustrated, it being noted that the vehicle frame has not been shown in the drawing for purposes of clarity. Moreover, insofar as the structure on each lateral side of the half-track vehicle is identical, the following description is directed toward only one side, where appropriate, for purposes of brevity. Further, insofar as several of the following configurations have parts in common, identical reference numbers are used in the following figures, where appropriate.

Figure 6:
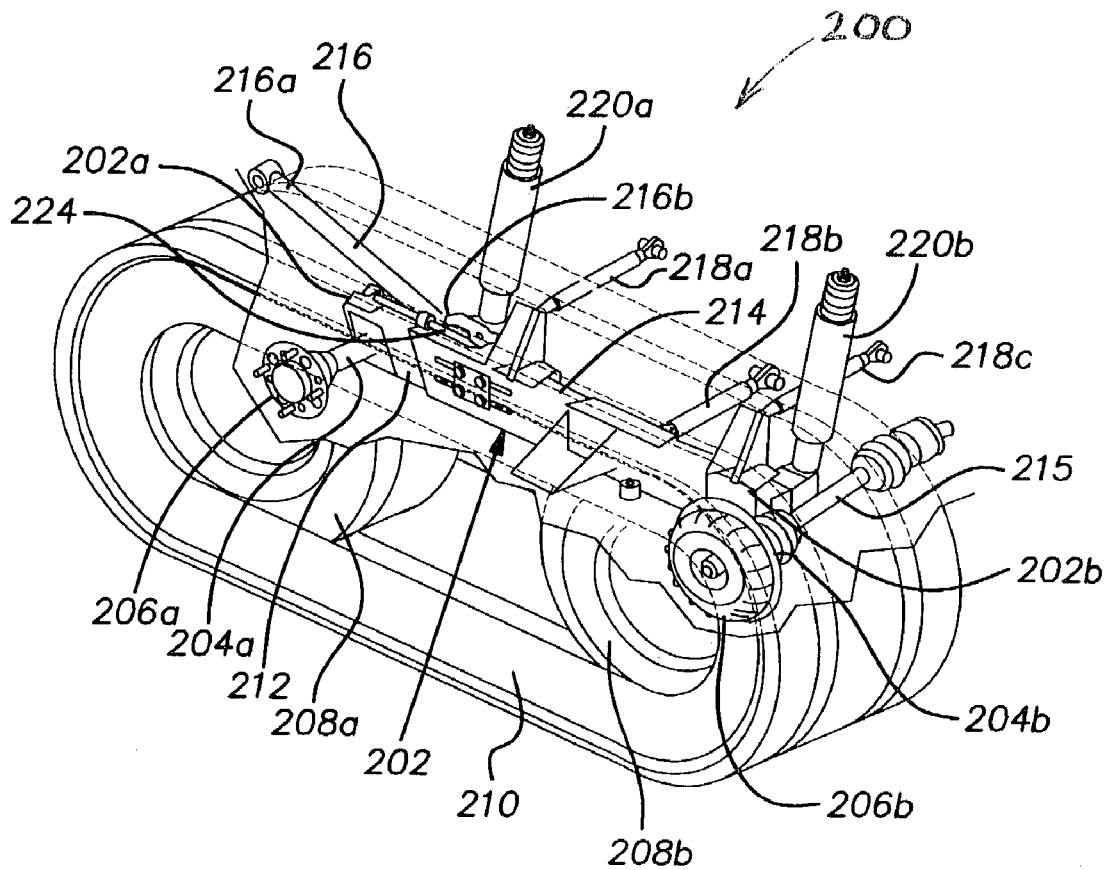
FIG. 6 is a perspective view, partially cut away, of a modified embodiment of a half-track suspension structure.

FIG. 6 is a partial cut away view of the suspension system 200 of the present invention. The suspension system 200 includes a beam 202 having a forward end 202a and a rearward end 202b. A forward or mid axle 204a and associated mid hub 206a are secured to the forward end 202a of the beam while a rear axle 204b and associated rear hub 206b are secured to the rearward end 202b of the beam 202. A mid wheel 208a is secured to the mid hub 206a and a rear wheel 208b is secured to the rear hub 206b. A track 210 is stretched around the outside of the wheels 208a, 208b.

The track 210 is preferably made of rubber and is most preferably about an inch thick. The wheels 208a, 208b are preferably made of a relatively hard material and the beam 202 is adjusted properly to fit the track 210. The appropriate adjustment and hardness prevents the track 210 from slipping off the wheels 208a, 208b due to the wheels 208 compressing to too great an extent. The beam 202 is preferably made of two parts 212, 214 that slidingly interfit one another, as discussed previously with regard to the embodiment of FIGS. 4–5. A drive shaft 215 is attached to the rear hub 206b to provide motive power to the rear wheels 208b. Alternatively, the drive shaft 215 may be attached to the mid hub 206a. Further, a drive mechanism to transfer motive power between the wheels 208a, 208b, such as a drive chain, may also be employed.

The beam 202 is suspended from the frame (not shown) by a trailing arm 216, three transverse suspension members 218a, 218b, 218c, and first and second cushions 220a, 220b. The trailing arm 216, transverse suspension members 218a, 218b, 218c, and cushions 220a, 220b are attached, either directly or indirectly, to both the beam 202 and the frame. Further, the trailing arm 216, transverse suspension members 218a, 218b, 218c, and cushions 220a, 220b are attached to the beam and/or the frame via a joint or series of joints that permit motion with three degrees of rotational freedom, such as a ball joint type connection or rubber bushings. It will be apparent to a person of ordinary skill in the art that the end that is attached to the frame must also permit rotation about a primary axis of rotation, with some degree of freedom about other axes in order to be functional.

The trailing arm 216 has a first or forward end 216a attached to the frame and a second or rearward end 216b attached to a top 224 of the beam 202 at the forward end 202a thereof. The position of the trailing arm 216 is important to force the mid axle 204a at the forward end 202a of the beam 202 to retract at a predetermined mechanical compliance angle. Preferably, the mechanical compliance angle is between about 5° and 15°. Because the mid axle 204a does not extend across the width of the vehicle (i.e., is not attached to the opposite beam), when the mid wheel engages or rides over an obstacle, the beam 202 tends to rotate about the rear hub 206a, as it is the most secure, being attached to the drive shaft 215. In an ordinary rotation, the mid axle 204a would tend to move primarily upwardly, and then would move at an angle backwardly. However, in order to have an appropriate ride, it is desirable for the mid axle 204a to move more angularly at the mechanical compliance angle. The use of the trailing arm 216 in the illustrated relatively forward position provides a relatively stiff guidance system for the forward end 202a of the beam, causing the mid axle 204a to move more rearwardly as it deflects upwardly upon engagement with rocks, sticks, ruts, and other objects that are encountered in an off-road environment.

Figure 7A:
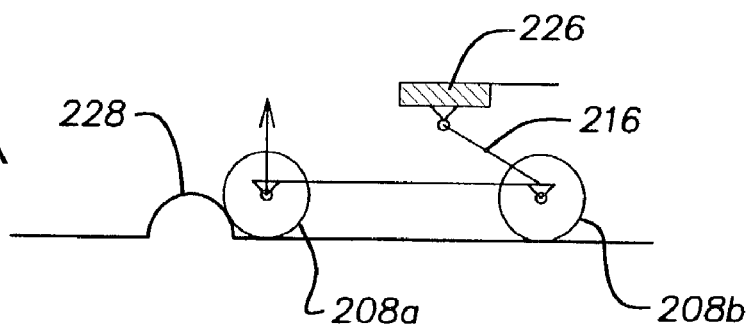
FIGS. 7a–7b schematically illustrate a vehicle with a forwardly/rearwardly disposed trailing arm traversing an obstacle.
Figure 7B:
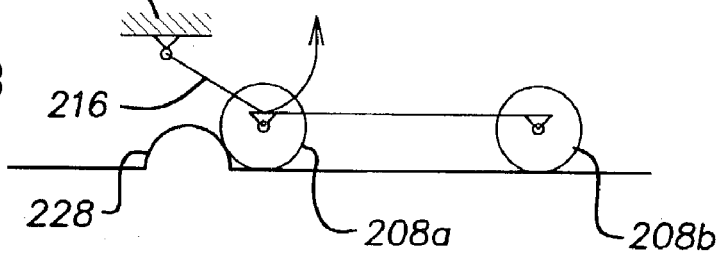

FIGS. 7a–7b illustrate the difference in movement of the beam 202 when the trailing arm 216 is positioned at the forward end 202a and the rearward end 202b of the beam 202. These drawings show only the beam 202, wheels 208a, 208b, trailing arm 216, and frame 226 in a schematic view, rather than the detailed structure of FIG. 6.

FIG. 7a illustrates the motion of the mid wheel 208a upon encountering an obstacle 228 when the trailing arm 216 is attached to the rearward end 202b of the beam 202. Because the trailing arm 216 is attached to the rearward end 202b of the beam 202, when the mid wheel 208a encounters the obstacle 228, the mid wheel 208a will tend to move independently of the motion of the trailing arm 216, and will tend to rotate around the axis of the rear wheel 208b. Because the beam 202 is relatively long, the motion of the mid wheel 208a will be mainly directed upwardly, as shown by the arrow in FIG. 7a. Although the motion is rotational, the length of the beam 202 does not provide a substantial angular deviation from vertical until the mid wheel 208a has reached some distance from the ground. Only when the rear wheel 208b contacts the obstacle 228 will the trailing arm 216 have a substantial effect to cause the beam 202 to retract rearwardly in addition to upwardly.

FIG. 7b illustrates the motion of the mid wheel 208a upon encountering an obstacle 228 when the trailing arm 216 is attached to the forward end 202a of the beam 202. Because the trailing arm 216 is attached to the forward end 202a of the beam 202, the mid wheel 208a will rotate upwardly about the point that the trailing arm 216 attaches to the frame 226. This is because the length of the trailing arm 216 is relatively short as compared to the length of the beam 202, and because the trailing arm 216 is attached near the attachment point of the mid wheel 208a. Because of the different rotation axis, the motion of the mid wheel 208a will tend to have a substantially greater rearward component, i.e., toward the direction of the rearward end 202b of the beam 202, than in the case shown in FIG. 7a. The rotational movement of the mid wheel 208a in the upward and rearward directions is shown by the arrow in FIG. 7(b).

It is most desirable that the mid wheel 208a moves in a manner similar to that shown in FIG. 7b. When the mid wheel 208a moves rearwardly at the desired mechanical compliance angle of between about 5° and about 15°, the shock load to the vehicle is reduced and thereby improves the ride for the passenger.

A forward cushion 220a and a rearward cushion 220b are used in the present embodiment, as illustrated in FIG. 6. The forward cushion 220a is preferably placed near the forward end 202a of the beam while the rearward cushion is preferably placed near the rearward end 202b of the beam 202. However, the forward and rearward cushions 220a, 220b can be placed in other locations either directly or indirectly attached to the beam 202. The cushions 220a, 220b primarily serve to enhance the ride of the vehicle, but may also serve as a stop to prevent over rotation of the beam 202. Alternatively, a stop (not shown) can be incorporated into the trailing arm 216 to limit rotation of the trailing arm 216.

With reference to FIG. 8, a modified version of the embodiment described hereinbefore with regard to FIGS. 6–7b is illustrated. Insofar as many parts of the vehicle shown in FIG. 8 are identical to those described with regard to FIG. 6, those parts are given the same reference numbers in FIG. 8, and are not further described hereinafter.

The embodiment of FIG. 8 includes a stabilizer bar 230 that extends across the width of the vehicle and interconnecting the beams 202 on first and second sides of the vehicle. The stabilizer bar is secured at each end 230a, 230b to one of the beams 202, and is rotatably secured at a mid-section 230c to the frame (not shown). In use, the stabilizer bar 230 generally serves to equalize the vertically-oriented forces experienced by the beams 202. If further information regarding the stabilizer bar 230 is desired, reference should be made to applicant's co-pending application Ser. No. 10/382,384, filed Mar. 6, 2003.

FIGS. 9a–9e illustrate a series of preferred embodiments for attaching the transverse suspension members 218a, 218b, 218 of FIGS. 6 and 8 to the frame, with the view being generally from the end of the vehicle. Each of FIGS. 9a through 9e shows the beams 202, mid axles 204a, mid wheels 208a, and one transverse suspension member 218a extending from a respective beam 202. Also shown in each drawing is at least a portion of two or more frame portions 250, 252.

In this regard it is noted that a conventional all terrain vehicle frame is generally formed as a series of linked components. The same is true of the frame of the MUV in the present case. The frame portions 250, 252, while not shown as being linked to one another in these drawing figures, are at least indirectly linked to one another through additional frame portions (not shown). The frame of an ATV typically includes at least one frame rail 250 that is offset from a centerline of the vehicle so as to extend along the vehicle relatively closer to one of the beams 202. Linking or cross members (not shown) extend between the frame rails 250. In the present case, the frame includes an additional support 252, which serves as a center beam extending along the centerline of the vehicle. The additional support is secured to one of the cross members or another frame element (not shown). Each of the drawings shows only one transverse suspension member 218a for ease of explanation and illustration. It will be understood by a person of ordinary skill in the art that the other transverse suspension members 218b, 218c are configured and attached in a similar manner.

FIGS. 9a and 9b illustrate one preferred manner of attaching the transverse suspension member 218a to the frame 250, 252. With reference to FIG. 9b, each of the transverse suspension members 218a are attached at a first end 218a' to one beam 202. The second end 218a'' of the transverse suspension members 218a are attached to the support structure 252 that is disposed at or adjacent the longitudinal centerline 258 of the vehicle.

With reference to FIG. 9a, the second ends 218a'' integrally include a tubular housing 254 defining a passageway that is oriented generally transverse (i.e., perpendicular) to the longitudinal axis or length of the transverse suspension members. The tubular housings 254 are placed next to one another such that the passageways defined thereby are in alignment with one another and the centerline so as to permit the insertion of a shaft or fastener 256, such as a pin or bolt, therethrough. The shaft or fastener 256 serves as a hinge pin over which the tubular housings 254, and hence the transverse suspension members 218a, pivot or rotate. The pin or fastener 256 is secured to a portion of the vehicle body or frame 250 through the support structure 252, and preferably held in place by a stop 262, such as a locking nut, cotter pin, locking clip, weld, etc. In the illustrated embodiment, the support structure 252 is a plate or bracket extending downwardly from the frame or body that includes a pair of aligned holes through which the pin or fastener 256 extends, so that the tubular housings are received partially within the support structure. The precise configuration of the fastener 256, stops 262, and support structure 252 is unimportant, except that the tubular housings 254 provided at the second ends 218a" of the transverse suspension members 218a must be able to rotate generally along one axis and must be secured to the frame or body of the vehicle. Any equivalent or interchangeable structure known to a person of ordinary skill in the art may be substituted for that shown herein without departing from the scope and spirit of the present invention.

FIGS. 9c and 9d illustrate a second manner of securing the transverse suspension members 218a, 218b, 218c to the frame is illustrated. Insofar as many components of the assembly shown in FIGS. 9c–9d are identical to those of FIGS. 9a–9b, such components are given identical reference numbers and are not described in detail hereinafter. In FIGS. 9c–9d the support structure 252 is a pair of plates or brackets extending downwardly from the frame or body, each of which includes first and second holes through which one of the pins or fasteners 256 extends. The pair of plates or brackets are spaced apart a distance and dimensioned such that the tubular housings are received therebetween and laterally offset from one another. One of the tubular housings is disposed within the support structure 252 such that the passageway provided thereby is aligned with the first holes formed in the plates or brackets so as to permit the pin or fastener 256 to extend through the first holes and the tubular housing. Similarly, the other tubular housing is disposed within the support structure 252 such that the passageway provided thereby is aligned with the second holes formed in the plates or brackets so as to permit another pin or fastener 256 to extend through the second holes and the tubular housing. The precise configuration of the pins or fasteners 256, stops 262, and support structure 252 is unimportant, except that the second ends 218a" of the transverse suspension members 218a must be able to rotate generally along one axis and must be secured to the frame or body of the vehicle.

FIG. 9e illustrates a further manner of connecting the transverse suspension members 218a, 218b, 218c to the frame in accordance with the present invention. Each transverse suspension member 218a is attached at a first end 218a' to one beam 202. Each transverse suspension member 218 extends to a second end 218a" that is located adjacent the frame portion 250 on the opposite side of the longitudinal centerline 258 of the vehicle from the respective first end of the transverse suspension member 218. The details of the attachment structure are not shown, but may be substantially similar to those shown in FIGS. 9a–9d above and any modifications that would be apparent to one of ordinary skill in the art.

With reference to FIGS. 10a–10b, the desirability of using as long an arm as is possible is illustrated. FIG. 10a shows the motion of an arm having a length of 600 units as its non-pivoting end moves a distance of 100 units vertically (y-direction). FIG. 10b shows the motion of an arm having a length of 300 units as its non-pivoting end moves a distance of 100 units vertically (y direction). Because each arm pivots around a single point, the second end moves in an arcuate manner. When the second end is displaced 100 units vertically, the arm will sweep an angle of a particular number of degrees, and the second end will be displaced horizontally, due to the nature of rotational motion. When the longer arm is used, the angle swept is less (9.6° instead of 19.2°) and the horizontal (x-direction displacement is also less (2.1 units instead of 4.2 units). The reduced angular displacement and horizontal displacement are desirable, when considered in the context of the use of the technology in a suspension system. In the case of a suspension system, a vertical displacement occurs when the track or wheels contact an obstacle, such as a log, rock, or other discontinuity of the land. When the track contacts a log or other obstacle that is 100 units high, the track and axle must displace 100 units in order to pass over the obstacle. It is desirable that the track, wheels, and other suspension components (i.e., transverse suspension members 218a, 218b, 218c) be moved laterally the minimum possible distance, so that the direction of the track is not displaced. It is also desirable that the angular displacement of the arm be minimized, as a lower angular displacement requires less of a clearance between the arm and other portions of the vehicle, such as frame components and the like, allowing greater flexibility in designing the underbody of the vehicle generally. Accordingly, the extension of the transverse suspension members as great a distance as possible across the vehicle is desirable.

Figure 11:
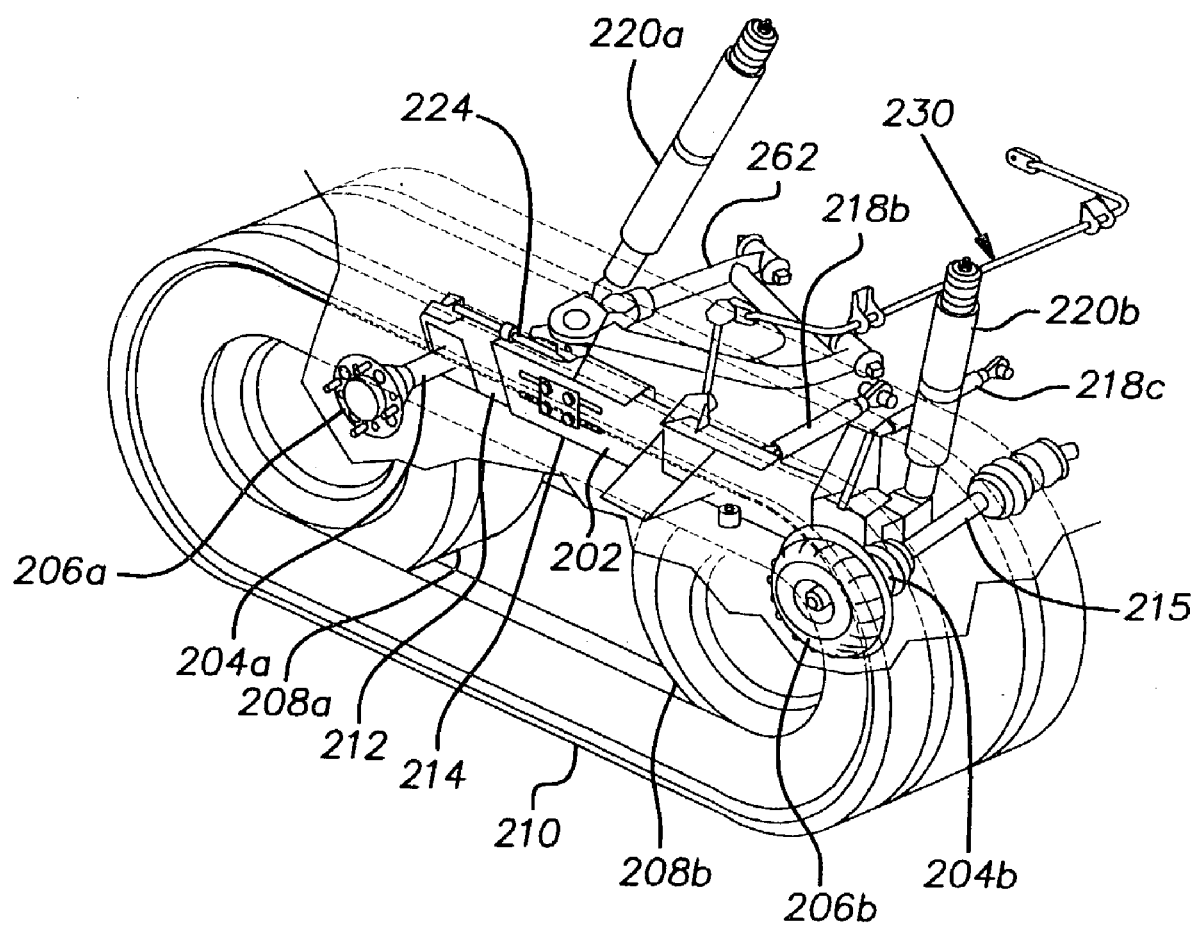
FIG. 11 is a partial perspective view of a further modified embodiment of a half track suspension structure including an A-arm.

FIG. 11 is a partial cut away view of further modified suspension system of the present invention. The illustrated suspension system includes several components that are identical to those previously described herein with reference to FIGS. 6 and 8. Accordingly, several components that have been described hereinbefore will not be described in detail hereinafter.

The illustrated suspension includes an A-arm 262, two transverse suspension members 218b, 218c, and two cushions 220a, 220b, each of which are attached, either directly or indirectly, to both the beam 202 and the frame (not shown) by means of a joint or series of joints that permit motion with three degrees of rotational freedom. The A-arm 262 is attached at a first point to the beam 202, and is attached to the frame at two spaced apart locations, as will be appreciated by those skilled in the art based upon the illustration of FIG. 11. In the most preferred embodiment, a ball joint-type joint is at least used to attach the A-arm 262 to the beam 202. It will be apparent to a person of ordinary skill in the art that the connection with the frame will also permit rotation about a primary axis of rotation, with some degree of freedom about other axes in order to be functional.

Figure 14:
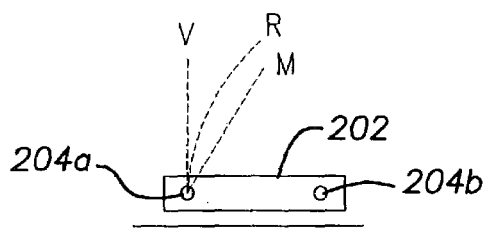
FIG. 14 schematically illustrates a comparison of the motion of the mid axle 204 along a vertical path V, a rotational path R, and a desirable mechanical compliance angle M.

The A-arm 262 is attached to the beam 202 and the frame at an angle to a horizontal plane. Preferably, this angle is between about 10–20° and, more preferably, this angle is approximately 16°. It is also most preferable that the A-arm 262 be attached to the top 224 of the beam 202 at the forward end 202a of the beam 202. The position and angle of the A-arm are important to force the mid axle 204a at the forward end 202a of the beam 202 to retract at a mechanical compliance angle of between 5° and 15°. As noted hereinbefore, because the beam 202 is not secured by a true axle, the beam 202 tends to rotate about the rear hub 206b, as it is the most secure. In an ordinary rotation, the mid axle 204 would tend to move primarily upwardly, and then would move at an angle backwardly. However, in order to have an appropriate ride, it is desirable for the mid axle 204 to move more angularly at the mechanical compliance angle. The use of the angled A-arm 262 in the forward position provides a relatively stiff guidance system for the forward end 202a of the beam, causing the mid axle to move more rearwardly as it deflects upwardly, due to encountering rocks, sticks, ruts, and other things that are likely to be encountered in an off-road environment. FIG. 14 shows a comparison of the motion of the mid axle 204 along a vertical path V, a rotational path R, and the desirable mechanical compliance angle M (the angles being exaggerated due to space constraints). The A-arm 262, because it is placed near to the forward end 202a of the beam 202, has the greatest ability to govern the motion of the beam. The A-arm 262 is preferably provided with a stop (not shown) that serves to prevent the beam 202 from rotating too greatly from its general horizontal placement. Some of this function can also be performed by one of the cushions 220a, 220b (the structure of which is described in greater detail below). The A-arm 262 serves to transmit motive and braking forces between the frame and the beam 202.

Figure 15:
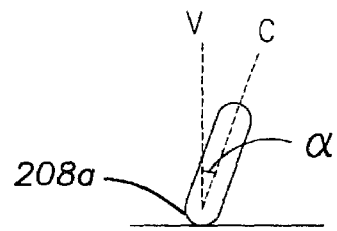
FIG. 15 schematically illustrates wheel camber.
Figure 16:
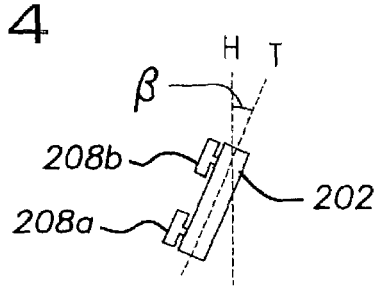
FIG. 16 schematically illustrates wheel toe.

The transverse suspension members 218 define the camber and toe of the wheels 208a, 208b and the beam 202. Camber and toe are static measurements that remain relatively constant regardless of the vertical or rotational position of the beam 202. FIG. 15 shows the general meaning of camber. The wheel 208a is typically placed at a slight angle to the ground, to provide additional stability. The angle $\alpha$ between a vertical position of the wheel V and the angle at which the wheel 208a in fact rests, angle C, is known as the camber. Camber angle $\alpha$ is preferably 0° but, in actual practice, is typically between about 0° and about 5°. FIG. 16 shows the general meaning of toe. The beam 202 and wheels 208a are angled slightly from the horizontal axis. The angle between the vertical direction (the direction of motion) H and the angle T at which the beam 202 rests is known as the toe angle $\beta$. The toe angle $\beta$ typically has a value between about 0° and about 2°. It is desirable that the toe angle $\beta$ be about 0° in the present application.

It is preferable that two cushions 220a, 220b be used in the present embodiment. One of the cushions 220a is preferably placed near the front end 202a of the beam 202. The other of the cushions 220b is preferably placed near the rear end 202b of the beam 202. In the preferred embodiment, the front cushion 220a is attached to the A-arm 262, rather than being directly connected to the beam 202. This placement is to conserve the space used on the beam 202. However, the front and rear cushions 220a, 220b can be placed in other locations, either directly or indirectly attached to the beam 202. The cushions 220a, 220b primarily serve to enhance the ride of the vehicle, but may also serve as a stop to prevent over rotation of the beam 202.

Figure 12:
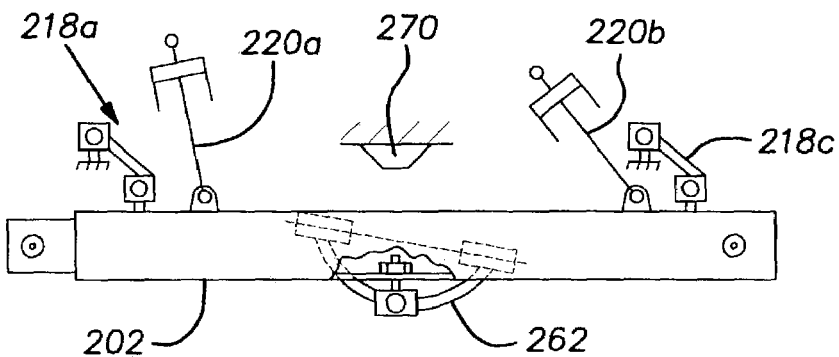
FIG. 12 is a schematic view of a modified attachment for an A-arm suspension system.

A modified version of the structure is shown in FIG. 12. In FIG. 12, the beam 202 is suspended by two transverse suspension members 218a, 218c, two cushions 220a, 220b, and an A-arm 262, each of which is preferably joined to at least one of the frame or the beam with a ball joint. Insofar as these members are structurally substantially the same as the parts with the same names described in connection with FIG. 11 above, they are not described in detail hereinafter. The primary difference between the embodiment of FIG. 11 and the embodiment of FIG. 12 is the placement of the A-arm 262.

In the embodiment of FIG. 12, the A-arm 262 is attached to the beam 202 on the bottom of the beam 202 and near the center of the beam 202. As noted above, the A-arm 262 is secured to the frame at an angle, which in this case may be between about 5° and about 10°. Instead of incorporating a stop into the A-arm 262, it is preferable to use a mechanical stop 270, which may be a rubber bumper type stop on the frame to prevent the beam 202 from contacting the frame. While this configuration will work satisfactorily under most conditions, it is considered to be less desirable than that of FIG. 11, as the placement of the A-arm 262 further from the forward end 202a of the beam 202 limits the force of the A-arm 360 to deflect the normal rotation of the A-arm 262. In addition, placement of the A-arm 262 on the bottom of the beam 202 increases the risk of damage to the A-arm 262 due to contact of the A-arm 262 with the ground or other debris. Accordingly, this configuration may be considered to be less desirable.

Figure 13:
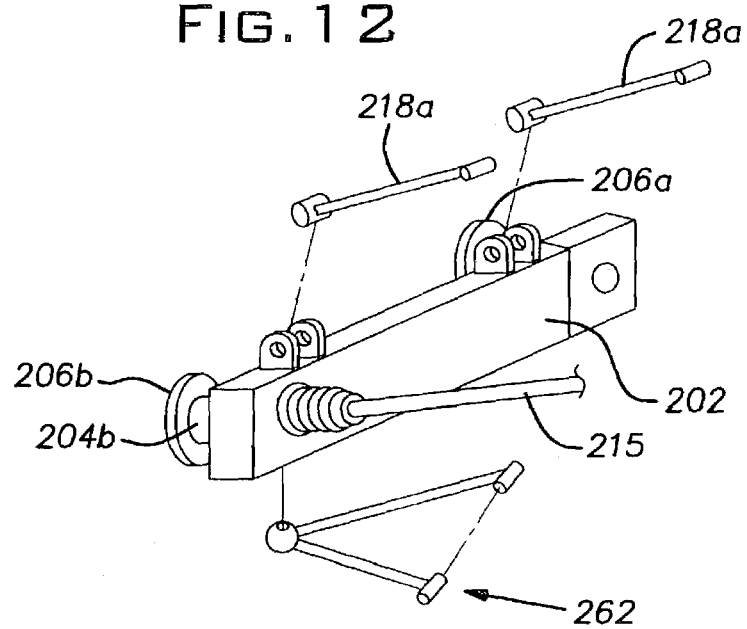
FIG. 13 schematically illustrates a further modified attachment for an A-arm suspension system.

A modified version of the A-arm suspension assembly is shown in FIG. 13. In FIG. 13, the beam 202 is again held by two transverse suspension members 218a, 218c, two cushions (not shown), and an A-arm 262, which are preferably joined to at least one of the frame or the beam with a ball joint. The primary difference between the embodiment of FIG. 11 and that of FIG. 13 is the placement of the A-arm 262.

In the embodiment of FIG. 13, the A-arm is attached to the beam 262 on the bottom of the beam 202 and near the rearward end 202b of the beam 202. As noted above, the A-arm 262 is secured to the frame at an angle. Instead of incorporating a stop into the A-arm 262, it is preferable to use a mechanical stop (not shown), which may be a rubber bumper type stop on the frame, to prevent the beam 202 from contacting the frame. This configuration is less desirable, as the placement of the A-arm 262 further from the forward end 202a of the beam 202 limits the force of the A-arm 262 to deflect the normal rotation of the A-arm 262. In addition, placement of the A-arm 262 on the bottom of the beam 202 increases the risk of damage to the A-arm 262 due to contact of the A-arm 262 with the ground or other debris. Accordingly, may be considered to be relatively less desirable. Although the embodiments of FIGS. 12 and 13 are less desirable than the embodiment of FIG. 11, they are satisfactory configurations for many uses.

What is claimed is:

1. A half-track vehicle, comprising:
   (a) a frame having a first side and a second side;
   (b) a first beam;
   (c) a second beam;
   (d) a first suspension system suspending the first beam from the frame adjacent the first side of the frame;
   (e) a second suspension system substantially separate from the first suspension system suspending the second beam from the frame adjacent the second side of the frame;
   (f) a forward wheel and a rearward wheel attached to each beam; and,
   (g) wherein said first suspension system includes at least one element that is attached to one of said frame and said first beam in a manner that permits three degrees of rotational movement and that transmits motive force from said first beam to said frame; and
   (h) wherein said second suspension system includes at least one element that is attached to one of said frame and said second beam in a manner that permits three degrees of rotational movement and that transmits motive force from said second beam to said frame.

2. The half-track vehicle according to claim 1, wherein said at least one element of each of said first and second suspension systems comprises a trailing arm.

3. The half-track vehicle according to claim 2, wherein said trailing arm of each of said first and second suspension systems is secured to a forward end of the beam supported by the suspension system adjacent said forward wheel and extends forwardly therefrom to the frame.

4. The half-track vehicle according to claim 3, wherein said trailing arm of each of said first and second suspension systems is secured to a top of the beam supported by the suspension system.

5. The half-track vehicle according to claim 4, wherein said trailing arm of each of said first and second suspension systems is secured to the beam supported by the suspension system such that said forward wheel, upon engagement with an obstacle, retracts at a mechanical compliance angle of between about 5–15°.

6. The half-track vehicle according to claim 5, further comprising a stop to limit rotation of the trailing arm of each of said first and second suspension systems.

7. The half-track vehicle according to claim 2, further comprising a stabilizer bar extending between said first and second beams, said stabilizer bar serving to equalize pressures experienced by said first and second beams.

8. The half-track vehicle according to claim 7, wherein said trailing arm of each of said first and second suspension systems is secured to a forward end of the beam supported by the suspension system adjacent said forward wheel and extends forwardly therefrom to the frame.

9. The half-track vehicle according to claim 8, wherein said trailing arm of each of said first and second suspension systems is secured to a top of the beam supported by the suspension system.

10. The half-track vehicle according to claim 9, wherein said trailing arm of each of said first and second suspension systems is secured to the beam supported by the suspension system such that said forward wheel, upon engagement with an obstacle, retracts at a mechanical compliance angle of between about 5–15°.

11. The half-track vehicle according to claim 10, further comprising a stop to limit rotation of the trailing arm of each of the first and second suspension systems.

12. The half-track vehicle according to claim 2, wherein said trailing arm of each of said first and second suspension systems is an A-arm.

13. The half-track vehicle according to claim 12, wherein said A-arm of each of said first and second suspension systems is secured to a forward end of the beam supported by the suspension system adjacent said forward wheel.

14. The half-track vehicle according to claim 13, wherein said A-arm of each of said first and second suspension systems is secured to a top of the beam supported by the suspension system.

15. The half-track vehicle according to claim 14, wherein said A-arm of each of said first and second suspension systems is secured to the beam supported by the suspension system such that said forward wheel, upon engagement with an obstacle, retracts at a mechanical compliance angle of between about 5–15°.

16. The half-track vehicle according to claim 14, further comprising a stop to limit rotation of the A-arm of each of said first and second suspension systems.

17. The half-track vehicle according to claim 13, further comprising first and second cushions on each of said first and second suspension systems, said first cushion being secured to the forward end of the beam supported by the suspension system at a location in common with said A-arm, and said second cushion being secured to a rearward end of the beam supported by the suspension system.

18. The half-track vehicle according to claim 12, further comprising a stabilizer bar extending between said first and second beams, said stabilizer bar serving to equalize pressures experienced by said first and second beams.

19. The half-track vehicle according to claim 18, wherein said A-arm of each of said first and second suspension systems is secured to a forward end of the beam supported by the suspension system adjacent said forward wheel and extends forwardly therefrom to the frame.

20. The half-track vehicle according to claim 19, wherein said A-arm of each of said first and second suspension systems is secured to a top of the beam supported by the suspension system.

21. The half-track vehicle according to claim 20, wherein said A-arm of each of said first and second suspension systems is secured to the beam supported by the suspension system such that said forward wheel, upon engagement with an obstacle, retracts at a mechanical compliance angle of between about 5–15°.

22. The half-track vehicle according to claim 21, further comprising a stop to limit rotation of the A-arm of each of said first and second suspension systems.

23. The half-track vehicle according to claim 18, further comprising first and second cushions, on each of said first and second suspension systems, said first cushion being secured to the forward end of the beam supported by the suspension system at a location in common with said A-arm, and said second cushion being secured to a rearward end of the beam supported by the suspension system.

24. The half-track vehicle according to claim 23, wherein said vehicle defines a longitudinal centerline and each suspension system includes a plurality of transverse suspension members, said transverse suspension members extending from each of said beams toward the other of said beams at least to said longitudinal centerline.

25. A half-track vehicle defining a longitudinal centerline and having a first side and an opposite second side, said vehicle comprising:
(a) a frame;
(b) a support structure that is a bracket extending downwardly from the frame at the longitudinal centerline;
(c) a first beam disposed on said first side of said vehicle;
(d) a second beam disposed on said second side of said vehicle;
(e) a first suspension system suspending the first beam from the frame;
(f) a second suspension system suspending the second beam from the frame, said second suspension system being substantially separate from the first suspension system;
(g) a forward wheel and a rearward wheel secured to each of said first and second beams;
(h) wherein said first suspension system includes at least one transverse suspension member, said at least one transverse suspension member extending from the first beam suspended by said first suspension system to said support structure at the longitudinal centerline; and
(i) wherein said second suspension system includes at least one transverse suspension member, said at least one transverse suspension member extending from the second beam suspended by said second suspension system to said support structure at the longitudinal centerline.

26. The half-track vehicle according to claim 25, wherein a first transverse suspension member has a proximal end attached to said first beam and a distal end secured to said support structure, and wherein a second transverse suspension member has a proximal end attached to said second beam and a distal end secured to said support structure.

27. The half-track vehicle according to claim 26, wherein said distal ends of said first and second transverse suspension members define tubular housings that are rotatably secured to the support structure.

28. The half-track vehicle according to claim 27, wherein said tubular housings define passageways that are aligned with one another.

29. A half-track vehicle defining a longitudinal centerline and having a first side and an opposite second side, said vehicle comprising:
  (a) a frame, said frame including a support structure intersecting said longitudinal centerline;
  (b) a first beam disposed on said first side of said vehicle;
  (c) a second beam disposed on said second side of said vehicle;
  (d) a first suspension system suspending the first beam from the frame;
  (e) a second suspension system suspending the second beam from the frame, said second suspension system being substantially separate from the first suspension system;
  (f) a forward wheel and a rearward wheel secured to each of said first and second beams;
  (g) wherein said first suspension system includes at least one transverse suspension member, said at least one transverse suspension member extending from the first beam suspended by said first suspension system to said support structure;
  (h) wherein said second suspension system includes at least one transverse suspension member, said at least one transverse suspension member extending from the second beam suspended by said second suspension system to said support structure; and
  (i) wherein said at least one transverse suspension member is attached to one of said frame and the beam suspended by the suspension system in which the transverse suspension member is included in a manner that permits three degrees of rotational movement.

30. A half-track vehicle defining a longitudinal centerline and having a first side and an opposite second side, said vehicle comprising:
  (a) a frame, said frame including a support structure intersecting said longitudinal centerline;
  (b) a first beam disposed on said first side of said vehicle;
  (c) a second beam disposed on said second side of said vehicle;
  (d) a first suspension system suspending the first beam from the frame;
  (e) a second suspension system suspending the second beam from the frame, said second suspension system being substantially separate from the first suspension system;
  (f) a forward wheel and a rearward wheel secured to each of said first and second beams;
  (g) wherein said first suspension system includes at least one transverse suspension member, said at least one transverse suspension member extending from the first beam suspended by said first suspension system to said support structure;
  (h) wherein said second suspension system includes at least one transverse suspension member, said at least one transverse suspension member extending from the second beam suspended by said second suspension system to said support structure; and
  (i) wherein said frame includes a first frame member disposed on said first side of said vehicle and a second frame member disposed on a second side of said vehicle, a first transverse suspension member has a proximal end attached to said first beam and a distal end secured to said second frame member, and a second transverse suspension member has a proximal end attached to said second beam and a distal end secured to said first frame member.

* * * * *